United States Patent
Ligon, Sr. et al.

[19]

[11] Patent Number: 6,110,404
[45] Date of Patent: Aug. 29, 2000

[54] METHOD OF EXTRUDING THERMOPLASTIC ELASTOMER FOAM USING WATER AS A BLOWING AGENT

[75] Inventors: James T. Ligon, Sr., Almont; Matthew P. Macker, Emmett, both of Mich.

[73] Assignee: Ligon Brothers Manufacturing Company, Almont, Mich.

[21] Appl. No.: 09/133,995

[22] Filed: Aug. 14, 1998

[51] Int. Cl.[7] ................................................. B29C 44/20
[52] U.S. Cl. ............................... 264/50; 264/53; 264/54; 264/101; 264/DIG. 5
[58] Field of Search ................................. 264/53, 50, 54, 264/DIG. 5, 101

[56] References Cited

U.S. PATENT DOCUMENTS

| | | |
|---|---|---|
| 3,824,139 | 7/1974 | Gareth . |
| 3,940,467 | 2/1976 | Brachman . |
| 4,104,207 | 8/1978 | Pelikan et al. . |

(List continued on next page.)

OTHER PUBLICATIONS

Suzorite® Publication (Description of Mica Flake and its uses—4 pages) (undated).

Customer Report: Santoprene® Thermoplastic Rubber, Foaming Santoprene® Rubber, Monsanto (18 pages) (undated).

Technical Note: Santoprene® Thermoplastic Rubber, Extrusion Foaming Technology For Santoprene® Thermoplastic Rubber. TPE–71–01 (12 pages) (Copyright, 1986).

Technical Note: Santoprene® Thermoplastic Rubber, Extrusion Processing of Santoprene® Thermoplastic Rubber, Monsanto TPE–18–01 (12 sheets, Copyright 1985).

Technical Note: Santoprene® Thermoplastic Rubber, Extrusion Foaming Technology For Santoprene® Thermoplastic Rubber (Revised). Monsanto (16 sheets total).

Technical Correspondence: Santoprene® Thermoplastic Rubber, Extrusion Foam Technology For Santoprene Thermoplastic Rubber Monsanto. May 10, 1987 (18 sheets total).

Cellular Solids, Structures and Properties; Lorna J. Gibson and Michael F. Ashby; Pergamon Press. Copyright 1988, p. 4 (3 sheets total).

Handbook of Thermoplastic Elastomers, Second Edition. Benjamin M. Walker and Charles P. Rader; Van Nostrand Reinhold Company, p. 126, 128, Copyright 1979 (4 sheets total).

Modern Plastics Mid–October Encyclopedia Issue "Foaming Agents", Mid–Oct. 1990 Issue, vol. 67, No. 11. pp. 184, 185, 187, 188, 291, 292. Copyright 1990 McGraw Hill (7 sheets total).

Technology News 'Foam Extrusion Technology For TP Elastomer'; Plastics Technology, Feb. 1987, p. 23. (1 sheet total).

Plastics Exrusion Technology Handbook by Sidney Levy. Industrial Press, Inc. Chapter Eight. Pp. 189–201. Copyright 1981. (9 sheets total).

Technology News 'Foam Extrusion Technology for TP Elastomer'; Plastics Technology, Feb. 1997. (2 sheets total).

*Primary Examiner*—Allan R. Kuhns
*Attorney, Agent, or Firm*—Dykema Gossett PLLC

[57] ABSTRACT

A method for extruding foam of a thermoplastic elastomer, which is a blend of olefin rubber and polyolefin resin, includes the steps of mixing the thermoplastic with water, introducing the mix to an extruder, melting and compressing the thermoplastic elastomer and water and extruding the resultant mix as foam. In more detail, a first quantity of thermoplastic elastomer in pellet form is mixed with a second quantity of water. The mixed water and thermoplastic is introduced to an extruder. The thermoplastic elastomer is melted and mixed with the water to a uniform mix of thermoplastic elastomer and water. The mix is extruded through a die, wherein the water expands in a vapor form to create foam cells with the cells having walls of the thermoplastic elastomer.

4 Claims, 2 Drawing Sheets

U.S. PATENT DOCUMENTS

| | | |
|---|---|---|
| 4,124,336 | 11/1978 | Johnson . |
| 4,130,535 | 12/1978 | Coran et al. . |
| 4,179,540 | 12/1979 | Smarook . |
| 4,278,767 | 7/1981 | DiGiulio et al. . |
| 4,278,768 | 7/1981 | DiGiulio et al. . |
| 4,311,628 | 1/1982 | Abdou-Sabet et al. . |
| 4,312,958 | 1/1982 | DiGiulio et al. . |
| 4,323,655 | 4/1982 | DiGiulio et al. . |
| 4,409,365 | 10/1983 | Coran et al. . |
| 4,455,272 | 6/1984 | Schubert et al. . |
| 4,517,316 | 5/1985 | Mason . |
| 4,593,062 | 6/1986 | Puydak et al. . |
| 4,657,715 | 4/1987 | Myers et al. . |
| 4,729,807 | 3/1988 | Hede et al. . |
| 4,898,760 | 2/1990 | Halberstadt et al. . |
| 5,070,111 | 12/1991 | Dumbauld . |
| 5,130,340 | 7/1992 | Allen et al. . |
| 5,334,336 | 8/1994 | Franz et al. ............................... 264/53 |
| 5,393,796 | 2/1995 | Halberstadt et al. . |
| 5,475,035 | 12/1995 | Park et al. . |
| 5,489,407 | 2/1996 | Suh et al. . |
| 5,512,601 | 4/1996 | Halberstadt et al. . |
| 5,604,266 | 2/1997 | Mushovic . |
| 5,605,937 | 2/1997 | Knaus . |
| 5,607,629 | 3/1997 | DeMello et al. . |
| 5,654,346 | 8/1997 | Halberstadt et al. . |

METHOD OF EXTRUDING THERMOPLASTIC ELASTOMER FOAM USING WATER AS A BLOWING AGENT

FIELD OF THE INVENTION

The present invention is directed to a method of extruding thermoplastic elastomer foam using water as a blowing agent. More particularly, the present invention is directed to a method for extruding thermoplastic elastomer foam in which the water and the thermoplastic elastomer are introduced to an extruder simultaneously.

BACKGROUND OF THE INVENTION

It is known to use water as a mechanical blowing agent in the extrusion of thermoplastic elastomer foam, and particularly the extrusion of such structures. Water is a desirable blowing agent, at least in part because it is non-toxic. Known methods of water blowing thermoplastic elastomers typically introduce the water to the thermoplastic elastomer after the thermoplastic elastomer has melted. Experience with extruding thermoplastic elastomer foam using water as a blowing agent has shown that certain extrusion profiles can be extruded at a rate of 40 to 80 feet per minute.

It is known how to produce low density foams from thermoplastic elastomers using water as a blowing agent which have certain compression or deflection rates, and compression set values, and low water absorption characteristics. However, simpler methods, not requiring the post-melt introduction of water, are sought.

It is desired to have a process for forming thermoplastic elastomer foam with water as a blowing agent suitable for use at increased extrusion speeds.

It is also desired to have a process for foaming thermoplastic elastomer foam which provides better control of the cell structure and the skin characteristics.

It is also desired to have a process for forming thermoplastic elastomer foam in which the water is introduced to the extruder simultaneous with the thermoplastic elastomer.

SUMMARY OF THE INVENTION

According to one aspect of the invention, a method for extruding foam of a thermoplastic elastomer, which is a blend of olefin rubber and polyolefin resin, includes the steps of mixing the thermoplastic with water, introducing the mix to an extruder, melting and compressing the thermoplastic elastomer and water and extruding the resultant mix as foam. In more detail, a first quantity of thermoplastic elastomer in pellet form is mixed with a second quantity of water. The mixed water and thermoplastic is introduced to an extruder. The thermoplastic elastomer is melted and mixed with the water to a uniform mix of thermoplastic elastomer and water. The mix is extruded through a die, wherein the water expands in a vapor form to create foam cells with the cells having walls of the thermoplastic elastomer.

The inventive process enables the use of water as a blowing agent at increased extrusion speeds.

The inventive process enables better control of the cell structure and the skin characteristics.

The inventive process also enables the forming of thermoplastic elastomer foam in which water is introduced as a blowing agent to the extruder simultaneous with the introduction of the thermoplastic elastomer to the extruder.

DETAILED DESCRIPTION

The inventive process or method includes the following steps. Selecting a thermoplastic elastomer. Selecting an extruding device. Measuring quantities of water and thermoplastic elastomer. Mixing the water with the thermoplastic elastomer. Feeding the thermoplastic elastomer into the extruder. Adjusting the speed, the temperatures and the pressure of the extruding device as required. Synchronizing the speed of the cooling conveyor with the speed of the quantity extruded. Each of the steps will now be discussed in more detail.

With regard to the selection of a thermoplastic elastomer, the inventive process was developed for use with a thermoplastic elastomer of the type marketed under the name Santoprene® by Advanced Elastomer Systems, L.P. of Akron, Ohio. U.S. Pat. No. 4,130,535, which is hereby incorporated by reference, describes a thermoplastic elastomer well suited for use in the inventive method. The thermoplastic elastomer is described as a thermoplastic vulcanizate, comprising blends of olefin rubber and thermoplastic olefin resin in which the rubber is completely cured. Even though the rubber is fully cured, the blends are nevertheless processable as a thermoplastic material. Similar compounds are described in U.S. Pat. No. 4,311,628 which is also incorporated herein by reference.

Santoprene® is available in a wide range of hardness. Santoprene® is also available in both black and in neutral (colorable) form. The grades of Santoprene® used in the development of the inventive process were on the Shore A durometer scale. Santoprene® having a Shore A durometer rating or hardness of 73 was successfully used in testing of the inventive method. It should be appreciated, however, that even though testing was limited to relatively soft grades of material, the process is tunable to making foam from material ranging from Shore A 55 to Shore D 50 if desired.

Figure 1:
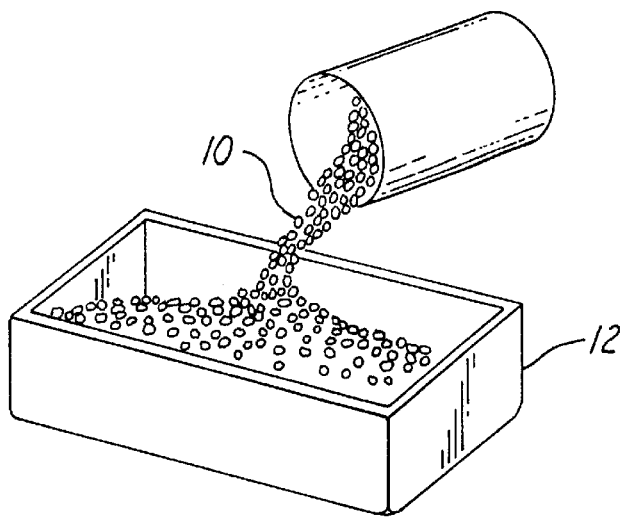
FIG. 1 is a perspective view of a tub receiving thermoplastic elastomer.
Figure 2:
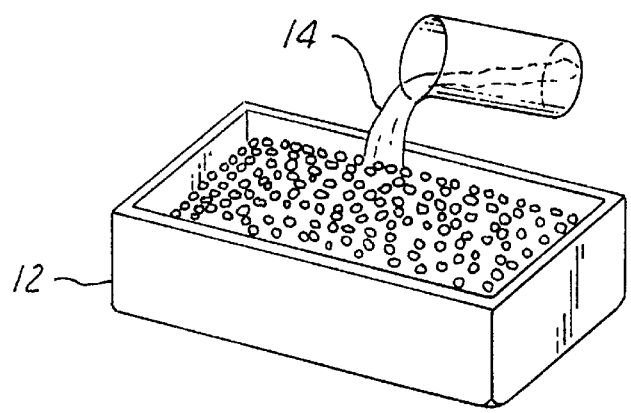
FIG. 2 is a perspective view of the tub of FIG. 1 receiving water.
Figure 3:
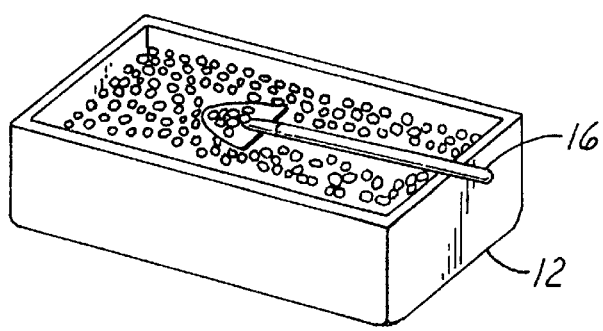
FIG. 3 is a perspective view of the tub of FIG. 2 showing a mixing operation.
Figure 4:
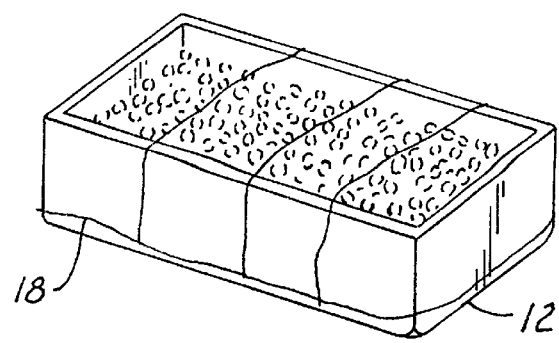
FIG. 4 is a perspective view of the tub of FIG. 3 in a sealed condition.
Figure 5:
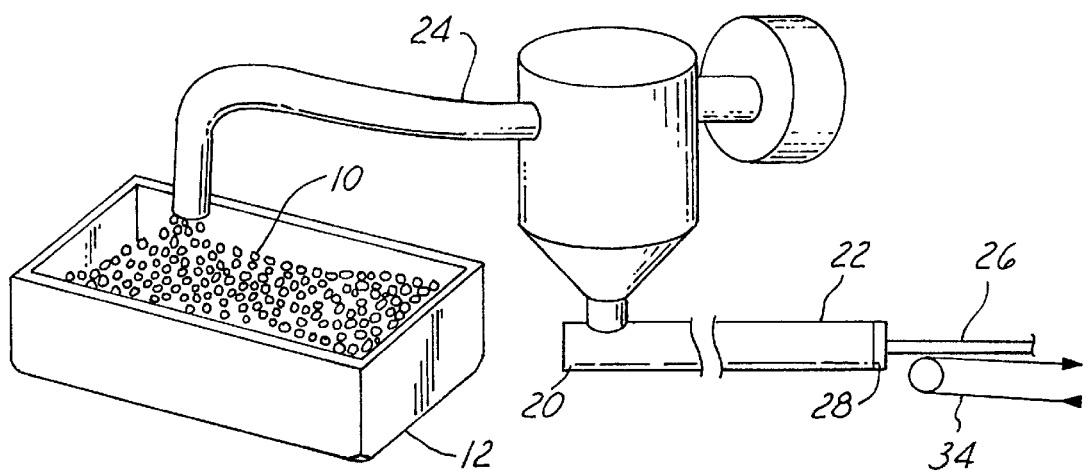
FIG. 5 is a schematic representation of an extrusion system.
Figure 6:
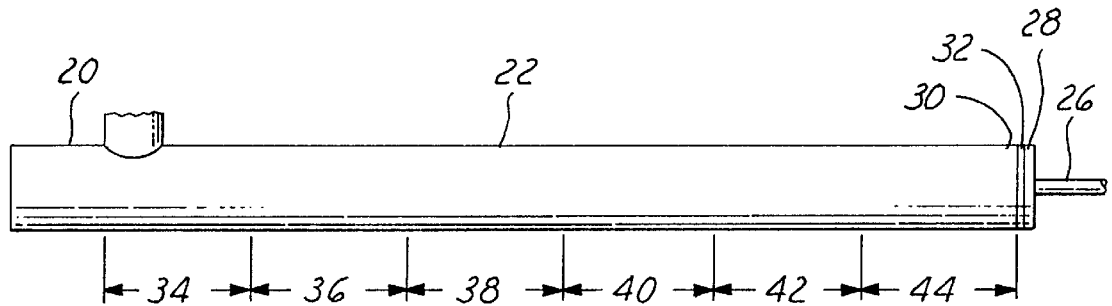
FIG. 6 is a schematic representation of the extruder of FIG. 5.

Predetermined quantities of thermoplastic elastomer and water are measured out and mixed. During testing, 500 pounds of thermoplastic elastomer beads 10 were measured out into a large tube 12 as shown in FIG. 1 and combined with 8% by weight, or 40 pounds, of water 14 as shown in FIG. 2. However, alternative mixing methods, including continuous mixing of beads and water are possible alternatives. The beads and water are folded over using a shovel 16 as shown in FIG. 5. After mixing, the tub 16 is sealed with plastic wrap 18 or some other suitable mechanism, with some air remaining at the top of the container. The beads are allowed to soak for a period of 24 hours. After 24 hours, tub 12 is unsealed and the beads and water are again mixed, being folded over with shovel 16 so that very little standing water remains in tub 12. The wet beads are then drawn from tub 12 and fed into a first end 20 of an extruder 22 by a vacuum type device 24. Some water is lost from extruder 22, escaping past seals at first end 20 of the extruder. It was noted that increasing the percent by weight of water combined with the beads increased the amount of water escaping past the seals of the extruder, but did not substantially change the characteristics of the foam extruded. Decreasing the amount of water to a much lower level, such as 2%, appeared to have a deleterious effect on the characteristics of the foam extruded.

Some tests were also run with 2.5% by weight of mica added to the mix as a nucleating agent.

Other tests were run with gas producing chemicals or chemical blowing agents being added to the water and bead mix. The chemicals can be added in powder or pellet form and are supplied in a polypropelene carriers. The gas producing chemicals have been of both the endothermic type and the exothermic type. Both types of chemicals are available from the Boehringer Ingelheim Chemical Company, Specialty Products Division. Hydrocerol is the name under which the endothermic chemicals are sold. Some foam samples were made with exothermic additive, others with endothermic additives and yet others with both endothermic and exothermic additives. The addition appeared to provide a finer cell structure.

Also, it would be possible to introduce a pressurized gas as a blowing agent to the water and thermoplastic elastomer within the extruder, preferably after the thermoplastic elastomer has melted. Extruder 22 is a single screw extruder having a barrel length to diameter ratio of approximately 30:1, and compresses and melts the thermoplastic elastomer. Extruder 22 receives material at the first end 20. Extruded foam 26 passes through a die 28 at a second end 30 of extruder 22. Die 28 helps control the cross sectional shape of the extruded foam 26. A screen pack 32 is placed at second end 30 extruder just before die 28 and serves to both filter the extruded material and to raise the pressure within the extruder adjacent to die 28. The combination of screens and the precise mesh sizes chosen for use in screen pack 32 can be varied to alter the pressure in front of die 28 as required. The temperature and rpm can also be varied to control flow rate and pressure. The pressure of the die can vary from 250 psi to 2500 psi depending on the shape and cross sectional area of the die. The speed at which foam leaves the extruder is largely a function of the pressure at the die. Pressure and speed are varied as required to control the dimensions of the extruded foam and the cell structure and skin characteristics, including the skin thickness, of the foam.

The extruder screw is preferably operated at 10 to 25 rpm for many of the foams made. However, foam can be formed at screw speeds varying anywhere from at least 1 to at least 60 rpm.

The extruder is divided into six temperature zones. The first temperature zone 34 is where the mix of water and thermoplastic enters the extruder. Temperature zones 36, 38, 40, 42 and 44 are between zone 34 and second end 30. Each temperature zone has independent heating and cooling devices for varying the temperature within each zone as desired. Cooling is commonly provided by water or air or oil flow while heat is provided by electro-resistive devices or oil flow. Exemplary temperatures are provided in the example cited below. The temperatures of a gate area between die 28 and second end 32 is also controlled by a heating mechanism. Because there is typically no need to cool die 28, a cooling mechanism was not used, although should one be desired, one could be integrated into die 28.

The objective of controlling the melt temperature at the point of extrusion is to obtain a melt temperature near die 28 low enough to get good strength but not so low that the melt has difficulty passing through screen 32 and die 28. Heating die 28 melts the extrusion at its outermost surface, providing a smooth skin over the extrusion for protection against water intrusion and wear. Pressure of the melted thermoplastic elastomer proximate to die 28 is adjusted to an optimal level. The rate in units of length per units of time of material which can be extruded from the second end of the extruder is a function of many factors including the rotational speed of the screw and the cross sectional area of the die. It is necessary to synchronize the speed of a take-off conveyer 34 which receives the extruded foam 26 to the speed of the foam 26 leaving the extruder 22. The take-off conveyer 34 is used to cool foam 26 and is run at speeds from approximately 100 to 200 feet per minute, depending on precise characteristics of the profile being extruded. This is a substantial improvement over the rate of 40 to 80 feet per minute for the prior art processes. Extrusion at yet higher rates of speed is possible, but was not done because of equipment limitations.

The following is an exemplary use of the above described method. Five hundred pounds of Santoprene® material having a Shore A hardness of 73 is mixed with 40 pounds (8% by weight) of water in tube 12. The water 14 and beads 10 are folded over with shovel 16. Tub 12 is sealed. After a 24 hour soak, bead 10 and water 14 are again mixed. The mixture, at 73 degrees Fahrenheit, is fed into extruder 22. Screen pack 32 includes a breaker plate with one course screen. The extruder temperature zones are maintained at the following temperatures:

| Zone | Temperature (Degrees Fahrenheit) |
| --- | --- |
| 1 | 200 |
| 2 | 210 |
| 3 | 330 |
| 4 | 380 |
| 5 | 380 |
| 6 | 380 |
| Gate | 385 |
| Die | 420 |

The extruder's screw is rotated at 35 rpm. The extruded foam 26 leaves extruder 22 at a rate of 195 feet per minute. The pressure proximate to the die is 625 psi. The resultant profile of the foam is approximately ¼" by ⅜". A 1" length specimen of the extruded profile was, after cooling, loaded to achieve a 50% deflection. Approximately 1.52 pounds of force was needed to compress the 1" length specimen from 0.256" to approximately 0.128".

It is to be understood that the above detailed description and example are merely exemplary in nature. Many variations from the detailed description and the example are possible within the scope of the present invention. For example, materials of widely different durometers may be employed. Different mixing methods may be used to combine the water with the thermoplastic pellets. The amount of time that the pellets are allowed to soak in the water may be varied. Indeed, it may be possible to entirely eliminate the soaking period. Different amounts of water may be used. Different screw speeds may be used in the extruder. Different feed rates may be employed. More or fewer temperature zones may be used on the extruder. The temperature within the different zones may be varied from those cited in the example. It is therefore to be understood that the scope of the invention is determined by the scope of the appended claims.

We claim:

1. A method for extruding foam of a thermoplastic elastomer, the thermoplastic elastomer including a blend of olefin rubber and polyolefin resin, the method comprising the steps of:

mixing a first quantity of the thermoplastic elastomer in pellet form with a second quantity of water by soaking the thermoplastic elastomer for at least 24 hours in a sealed container and then remixing the water and thermoplastic elastomer;

introducing the mixed water and thermoplastic elastomer to an extruder;

melting and compressing the thermoplastic elastomer and mixing with the water within the extruder to a uniform mix of thermoplastic elastomer and water; and extruding the mix through a die wherein the water expands in a vapor form to create foam cells with the cells having walls of the thermoplastic elastomer.

2. A method for extruding foam of a thermoplastic elastomer, the thermoplastic elastomer including a blend of olefin rubber and polyolefin resin, the method comprising the steps of:

mixing a first quantity of the thermoplastic elastomer in pellet form with a second quantity of water;

introducing the mixed water and thermoplastic elastomer to an extruder;

introducing a chemical blowing agent to the water and thermoplastic elastomer;

melting and compressing the thermoplastic elastomer and mixing with the water within the extruder to a uniform mix of thermoplastic elastomer and water; and extruding the mix through a die wherein the water expands in a vapor form to create foam cells with the cells having walls of the thermoplastic elastomer.

3. A method for extruding foam of a thermoplastic elastomer, the thermoplastic elastomer including a blend of olefin rubber and polyolefin resin, the method comprising the steps of:

mixing a first quantity of the thermoplastic elastomer in pellet form with a second quantity of water;

introducing the mixed water and thermoplastic elastomer to an extruder;

introducing a gas blowing agent to the water and thermoplastic elastomer after the water and thermoplastic elastomer have been introduced to the extruder and after the thermoplastic elastomer has melted;

melting and compressing the thermoplastic elastomer and mixing with the water within the extruder to a uniform mix of thermoplastic elastomer and water; and extruding the mix through a die wherein the water expands in a vapor form to create foam cells with the cells having walls of the thermoplastic elastomer.

4. A method for extruding foam of a thermoplastic elastomer, the thermoplastic elastomer including a blend of olefin rubber and polyolefin resin, the method comprising the steps of:

mixing a first quantity of the thermoplastic elastomer in pellet form with a second quantity of water and a chemical blowing agent;

introducing the mixed water and thermoplastic elastomer and the chemical blowing agent to an extruder;

melting and compressing the thermoplastic elastomer and mixing with the water and the chemical blowing agent within the extruder to a uniform mix of thermoplastic elastomer and water; and extruding the mix through a die wherein the water expands in a vapor form to create foam cells with the cells having walls of the thermoplastic elastomer.

* * * * *